United States Patent
Stoves et al.

(10) Patent No.: US 6,171,435 B1
(45) Date of Patent: Jan. 9, 2001

(54) METHOD OF INSTALLING PIPES

(75) Inventors: Derek Stoves; William Edgar Robinson, both of Newcastle upon Tyne (GB)

(73) Assignee: BG plc (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/952,448
(22) PCT Filed: May 20, 1996
(86) PCT No.: PCT/GB96/01199
  § 371 Date: Feb. 23, 1998
  § 102(e) Date: Feb. 23, 1998
(87) PCT Pub. No.: WO96/37724
  PCT Pub. Date: Nov. 28, 1996

(30) Foreign Application Priority Data

May 22, 1995 (GB) .................................................. 9510433

(51) Int. Cl.$^7$ ............................... B08B 9/02; B29C 63/34
(52) U.S. Cl. ........................ 156/293; 15/104.33; 29/234; 29/468; 138/97; 156/294; 156/423; 254/134.3 FT
(58) Field of Search ..................................... 156/293, 294, 156/423; 264/269, 516; 138/97, 98; 29/402.09, 455.1, 464, 468, 234, 235; 15/104.33; 254/134.3 FT; 405/150.1, 154, 155

(56) References Cited

U.S. PATENT DOCUMENTS

| | | | |
|---|---|---|---|
| 801,759 | * 10/1905 | Woolldridge et al. | ............ 15/104.33 |
| 3,211,573 | * 10/1965 | Hight et al. | ............... 138/97 |
| 3,211,574 | * 10/1965 | Shannon | .................. 138/97 |
| 3,560,395 | * 2/1971 | Kimbrell et al. | ....... 138/98 |
| 3,607,361 | * 9/1971 | Hight | ..................... 138/97 |
| 3,950,461 | 4/1976 | Levens . | |
| 4,771,500 | * 9/1988 | Kovacs | ............... 15/104.33 |
| 4,956,041 | 9/1990 | Miyazaki et al. . | |
| 5,108,533 | 4/1992 | Long, Jr. et al. . | |
| 5,181,668 | * 1/1993 | Tsuji et al. | ............ 264/269 |
| 5,200,011 | * 4/1993 | Imamura et al. | .......... 156/294 |
| 5,356,502 | * 10/1994 | Kamiyama et al. | ......... 156/294 |
| 5,482,076 | * 1/1996 | Taylor et al. | ........ 29/402.09 |
| 5,673,469 | * 10/1997 | Dickson et al. | ........ 29/402.09 |
| 5,752,786 | * 5/1998 | Huikari | .............. 405/154 |

FOREIGN PATENT DOCUMENTS

| | | | |
|---|---|---|---|
| 0 213 674 | 3/1987 | (EP) . | |
| 2041147 | * 9/1980 | (GB) | ..................... 138/97 |
| 2213230 | * 9/1989 | (GB) . | |
| 2243658 | * 11/1991 | (GB) . | |
| 2290121 | * 12/1995 | (GB) . | |
| 61-39400 | * 3/1986 | (JP) . | |
| 61-100437 | * 5/1986 | (JP) | ..................... 156/294 |
| 87/05376 | 9/1987 | (WO) . | |
| WO 90/07672 | * 7/1990 | (WO) . | |

* cited by examiner

Primary Examiner—Steven D. Maki
(74) Attorney, Agent, or Firm—Larson & Taylor, PLC

(57) ABSTRACT

A steel service pipe is connected to a main by a tee. A flexible assembly is inserted through the open end of the pipe and through the tee into the main. The flexible assembly includes a section of lower stiffness and a ball and socket connection of even lower stiffness at its leading end. The ball is connected to a weight. The weight falls down on entering the tee and creates a turning moment on the assembly. A plastic pipe is inserted through the open end of the pipe over the assembly and is inserted through the tee into the main. The pipe has a corrugated leading end which is more flexible than the remainder of the pipe and has a tapered nose terminating in a cylindrical mouth which enters an aperture in a liner in the main.

10 Claims, 5 Drawing Sheets

METHOD OF INSTALLING PIPES

FIELD OF THE INVENTION

This invention relates to installing pipes.

More particularly, the invention relates to installing a plastic service pipe in an existing metallic e.g. steel service pipe.

BACKGROUND OF THE INVENTION

Typically the service pipe is a gas service pipe connected by a tee or bend to a cast iron main. Where the main has been lined with a plastic liner, the service pipe is required to have a plastic pipe installed inside it. An aperture is cut through the wall of the liner at each tee or bend (where the tee or bend joins the main) so that each aperture is aligned with the tee or bend. The cutting of such apertures is achieved, for example, using a machine which travels along inside the plastic liner.

SUMMARY OF THE INVENTION

The invention is not limited to installing gas service pipes but is applicable to water, sewage or other service pipes, for example.

According to the invention there is provided, a method of installing a plastic service pipe in an existing service pipe which extends from an existing aperture in a main containing a plastic liner to an open end, the method comprising inserting a flexible assembly through the open end and along the existing service pipe, feeding a plastic service pipe fitted over said flexible assembly along said flexible assembly through the open end and through said existing service pipe to a position at an aperture in the plastic liner aligned with the existing aperture, and at which position at least a leading portion of the flexible assembly enters said liner through the aperture therein and a leading end of the plastic service pipe can be joined to the liner at the said aperture in the liner, said flexible assembly comprising a first, flexible, coiled wire member having at its leading end a second, flexible, coiled wire member, the stiffness of the second coiled wire member being less than the stiffness of the first coiled wire member, the second coiled wire member having at its leading end a ball-and-socket connection formed of a ball element and a socket element of which one leads the other and is connected to a weight, said leading portion comprising said second coiled wire member, the ball-and-socket connection and said weight, and the arrangement being such that when the flexible assembly, except for said leading portion, is supported in an horizontal position and the leading portion is unsupported except for its connection with the remainder of the flexible assembly, the leading portion is deflected downwardly by gravity.

A flexible assembly for use in performing the method according to the invention comprises a first, flexible, coiled wire member having at its leading end a second, flexible, coiled wire member, the stiffness of the second coiled wire member being less than the stiffness of the first coiled wire member, the second coiled wire member having at its leading end a ball-and-socket connection formed of a ball element and a socket element of which one leads the other and is connected to a weight, said leading portion comprising said second coiled wire member, the ball-and-socket connection and said weight, and the arrangement being such that when the flexible assembly, except for said leading portion, is supported in a horizontal position and the leading portion is unsupported except for its connection with the remainder of the flexible assembly, the leading portion is deflected downwardly by gravity.

The existing service pipe may be joined to the main in many different ways. For example, the service pipe may be straight, and may join the main by being directly joined to it at an aperture through the wall of the main. The service pipe may have a swept bend in it, particularly adjacent the main. For example, the existing service pipe may be connected to the main at the top of the main and then have a swept bend to enable the service pipe to continue its run along a horizontal path. Alternatively, a tee connection may be connected to the main, e.g. at the top of the main. The tee connection, in effect, provides an internal path which changes abruptly in direction from a first direction say vertical to a second direction at right angles to the first extending in the horizontal direction.

The service pipe may have swept bends in it in order to negotiate obstacles in its path and for convenience. Often, the change in direction of the path of the service pipe is made by the use of one or more right-angle elbows each of which connect two straight lengths of pipe together at right-angles, instead of bending the pipe.

The plastic service pipe used depends on the operating conditions of the gas system as well as the size of existing service pipe, its length and the number and kind of the bends, tee joints or elbows in it. For example, plain polyethylene pipe may be used but, depending on its diameter and the number and kind of bends, tee joints or elbows present in the existing service pipe, difficulty be may experienced in persuading the plastic pipe to negotiate the various changes in direction of the existing service pipe. A thinner or more flexible material may be used for the plastic service pipe and the diameter of the plastic service pipe may be reduced, particularly where higher gas pressures are to be used in the completed system.

Another possibility is to use a plastic service pipe which has, at least at its leading end, a corrugated wall which enables the pipe more readily to negotiate bends, elbows and tee connections. A further possibility is to use a plastic service pipe which has a corrugated wall throughout its length or which has a corrugated wall containing means providing a plain bore to the pipe such as a plain inner wall.

In cases where the existing service pipe presents difficulties to the plastic service pipe's advance through it, for example where elbows are present or where there is a tee joint, apparatus may be used comprising a flexible assembly or a coiled wire member. Either the flexible assembly is inserted through the existing service pipe first and then the plastic service pipe is inserted over the flexible assembly or the flexible assembly is inserted first of all in the plastic service pipe and then the two are inserted together through the existing service pipe.

BRIEF DESCRIPTION OF THE DRAWINGS

The invention will now be further described, by way of example, with reference to the accompanying drawings, in which.

DESCRIPTION OF THE PREFERRED EMBODIMENTS

Figure 1:
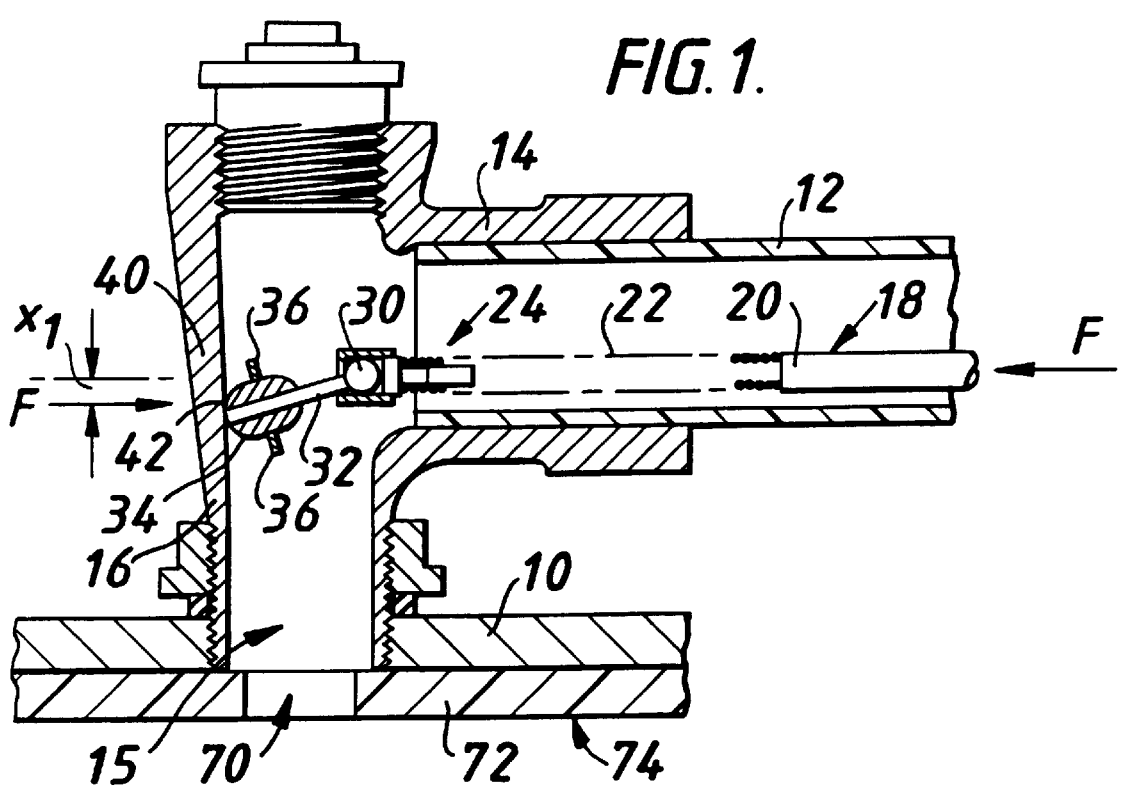
FIG. 1 is a vertical cross-sectional view of a service pipe connected to a main through which a flexible assembly has been inserted.

FIG. 1 shows a gas main 10 buried in the ground and an existing steel service pipe 12 which extends to, for example, a position within a dwelling at which normally it is connected to a gas meter (not shown). In order to perform the method according to the invention, the main is "dead" i.e. it is empty of gas and the meter has been removed leaving an open end (not shown) to the steel service pipe 12 within the dwelling or commercial property which is to be supplied with gas.

The service pipe 12 is connected to the main 10 by a tee 14 at an existing aperture 15 in the main 10, though instead the pipe 12 may be connected to the main 10 by a bend (not shown) e.g. a swept bend of relatively large radius of curvature. The tee 14 presents a very difficult route to the insertion of a plastic service pipe being propelled along the steel service pipe 12, the bore of the tee 14 executing virtually a right-angle as it turns from the line of the pipe 12 to the vertical leg 16 of the tee 14. The existing service pipe 12 may also have other bends or elbows in it for convenience and to avoid external obstacles.

In FIG. 1, a flexible assembly 18 is shown which has been inserted through the open end of the pipe 12 and pushed as far as the tee 14. The assembly 18 comprises a first, flexible, coiled wire member 20, having at its leading end a second flexible, coiled wire member 22. The stiffness of the member 22 is less than that of the member 20.

The member 20 has at its leading end a ball-and-socket connection 24 having only a low stiffness. The stiffness of the connection 24 is extremely low being dependent on the friction between its socket and its ball.

The ball 30 of the connection 24 is connected to an arm 32 which carries a weight 34 which is ahead of the connection 24. The weight 34 has several flexible fingers 36 (or in a modification, not shown, a flexible disc extending around the weight 34). The fingers 36 are equiangularly spaced around the weight 34. As the flexible assembly 18 is urged against the end wall 40 of the tee 14 an anti-clockwise moment $M=Fx_1$ is exerted on the member 22 of the assembly 18. The moment M is the product of the force F, with which the assembly 18 is urged at the remote end and which is counteracted by a reaction F acting on the weight 34 and arising at the wall 40, and the vertical offset $x_1$ between the line of the assembly 18 and the point of contact 42 between the weight 34 and the wall 40.

Figure 2:
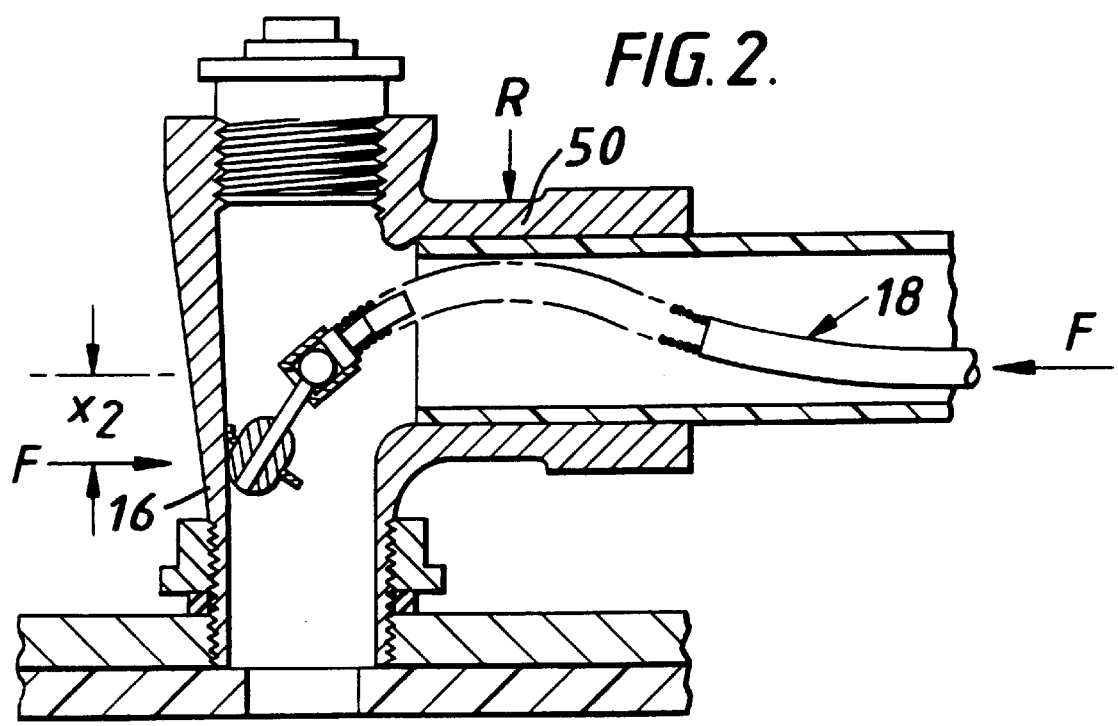
FIG. 2 is a vertical cross-sectional view of the service pipe and main of FIG. 1 after insertion of the flexible assembly through a vertical leg.

FIG. 2 shows the position when the assembly 18 has entered the vertical leg 16 and the moment M continues to exert a counter-clockwise turning effect upon the assembly 18 and particularly on the less stiff member 22. As the assembly 18 rises it is affected by a reaction R from the horizontal leg 50 of the tee 14, which deflects the end of the wire in the direction of R, thus increasing the displacement x from $x$, to $x_2$. The moment is thus larger now because the offset is $x_2$ as shown in the drawing.

Figure 3:
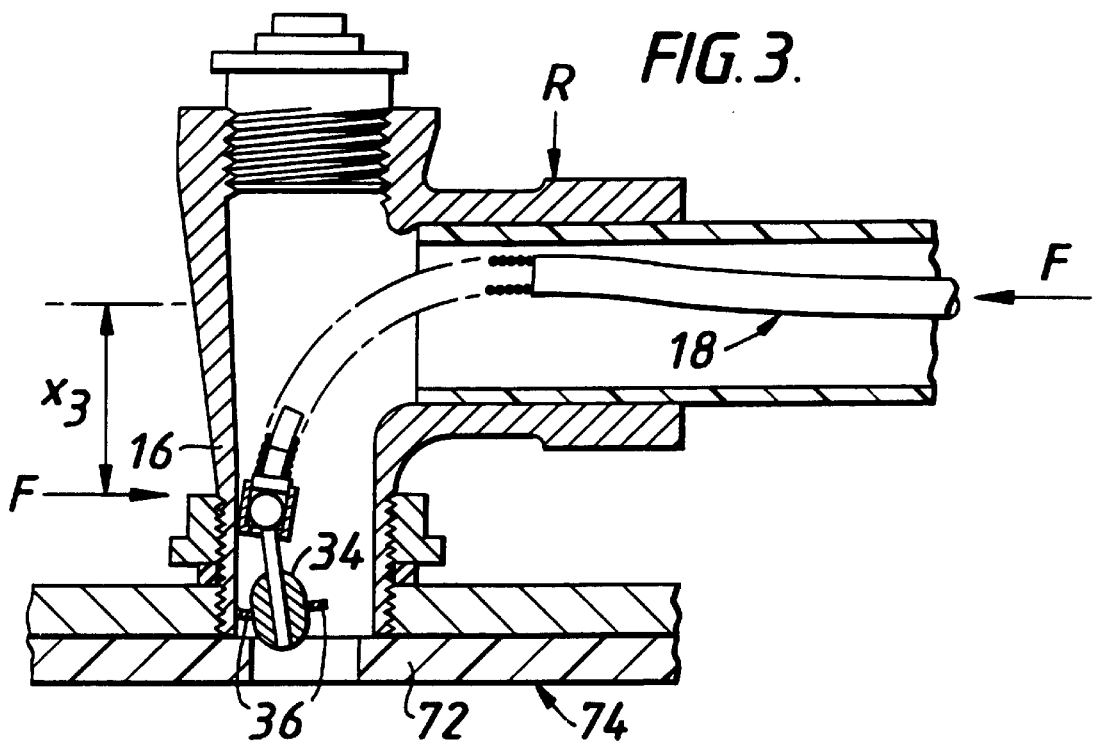
FIGS. 3–5 show the assembly progressively moving through the vertical leg of the service pipe and main shown in FIGS. 1 and 2.
Figure 4:
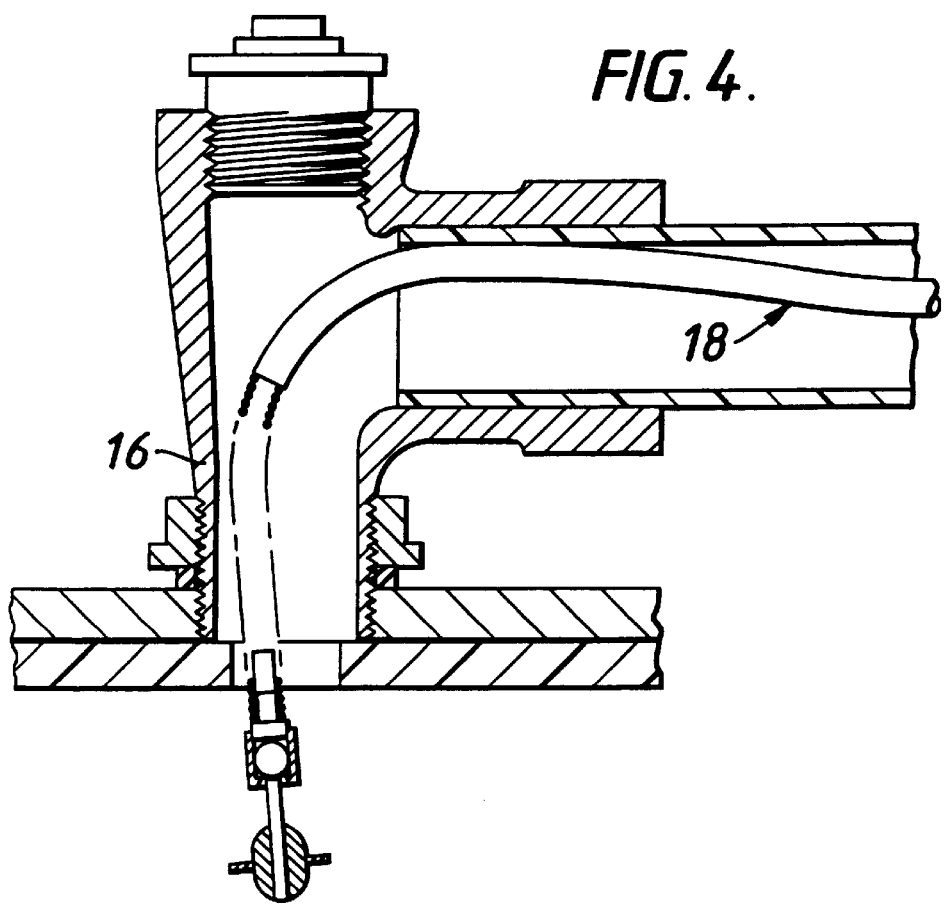
Figure 5:
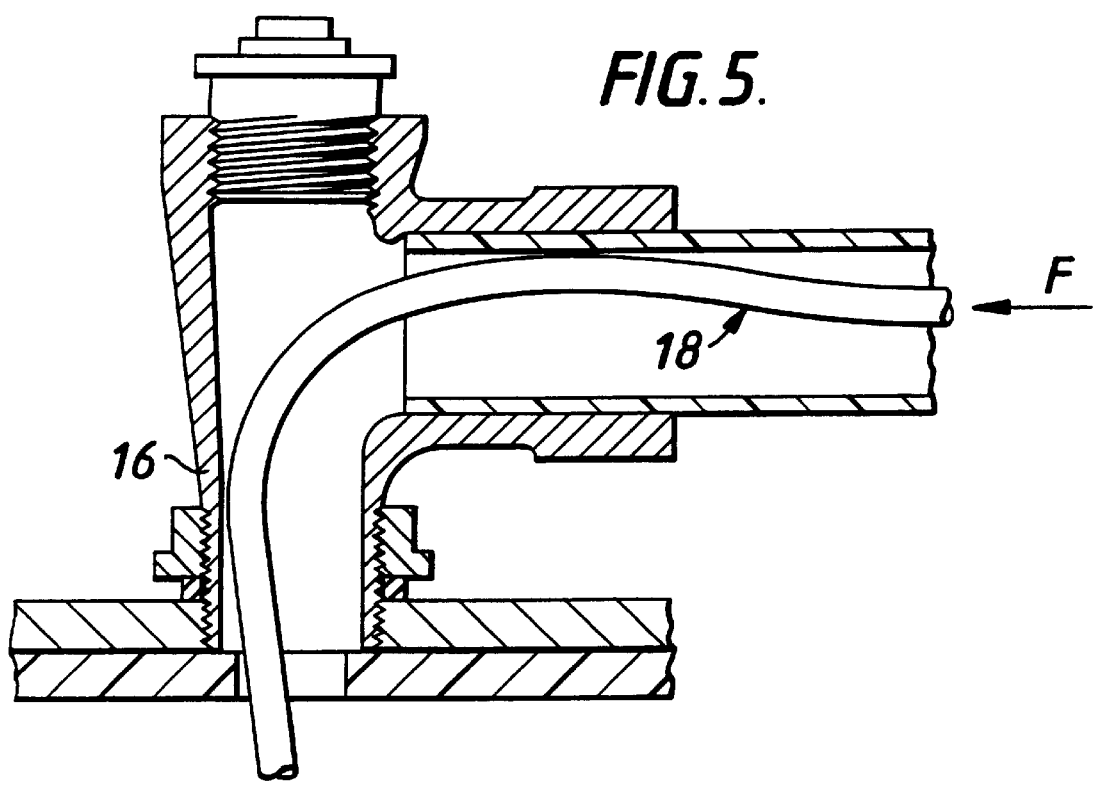

FIGS. 3, 4 and 5 show the assembly 18 progressively entering further and further into the vertical leg 16 and from FIG. 4 onwards also entering the main. The moment which is exerted in FIG. 3 is $M=Fx_3$ which is larger still because $x_3$ is larger. Reaction R ensures that the lead end is propelled towards the aperture 15.

In FIG. 3 the fingers 36 are shown keeping the weight 34 away from the wall of the vertical leg 16 of the tee 14 and closer to a centralised position. The lower end of the weight 34 is thus free to find and enter an aperture 70 in a liner 74 extending within the main 10.

Figure 6:
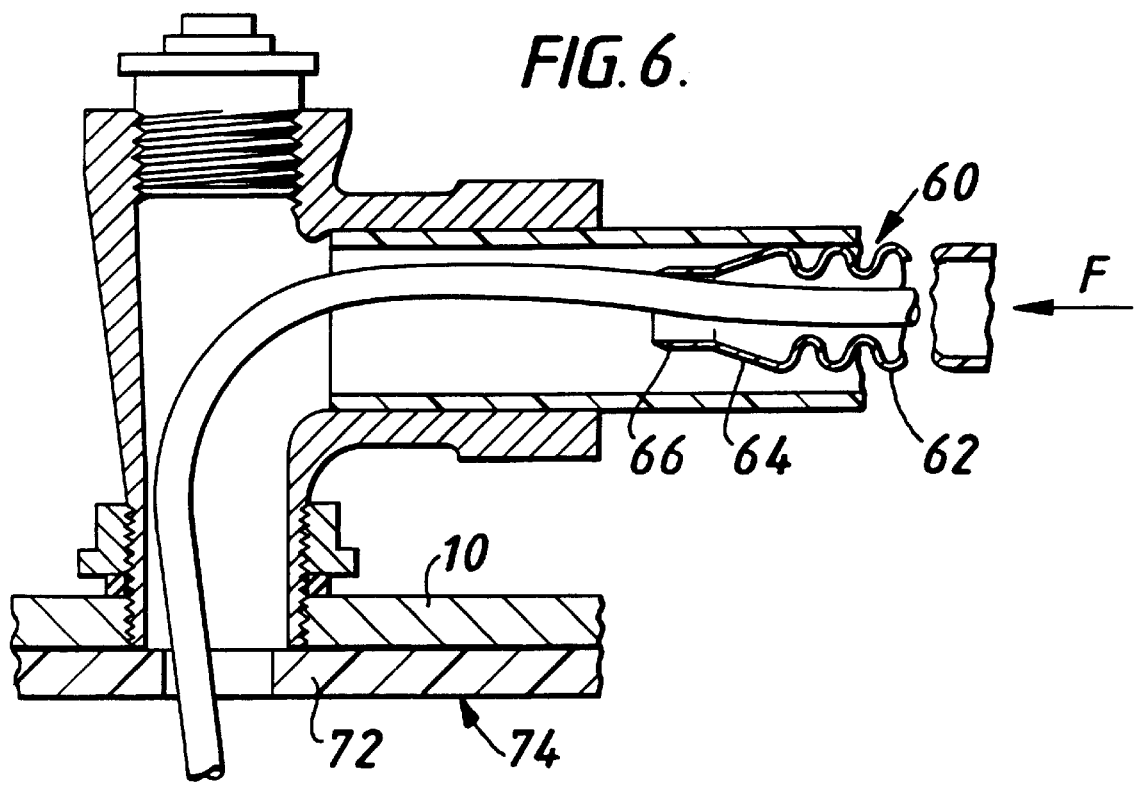
FIG. 6 is a vertical cross-sectional view of the service pipe and main of FIGS. 1–5, a plastic service pipe having been inserted over the flexible assembly.

FIG. 6 shows a plastic service pipe 60 being inserted over the assembly 18. The pipe 60 has been inserted through the open end of the service pipe 12 and the pipe 60 is guided by the assembly 18. The pipe 60 is made of polyethylene, for example, and the main section of the pipe 60 has a cylindrical wall while the leading section 62 of the pipe is made of polyethylene having a corrugated wall and is less rigid and more flexible than the main section of the pipe 60. The leading end 64 of the section 62 is shaped so as to facilitate passage through the service pipe 12 and the tee 14 and is slightly frusto-conical tapering towards a cylindrical section 66 forming the nose of the section 62.

Figure 7:
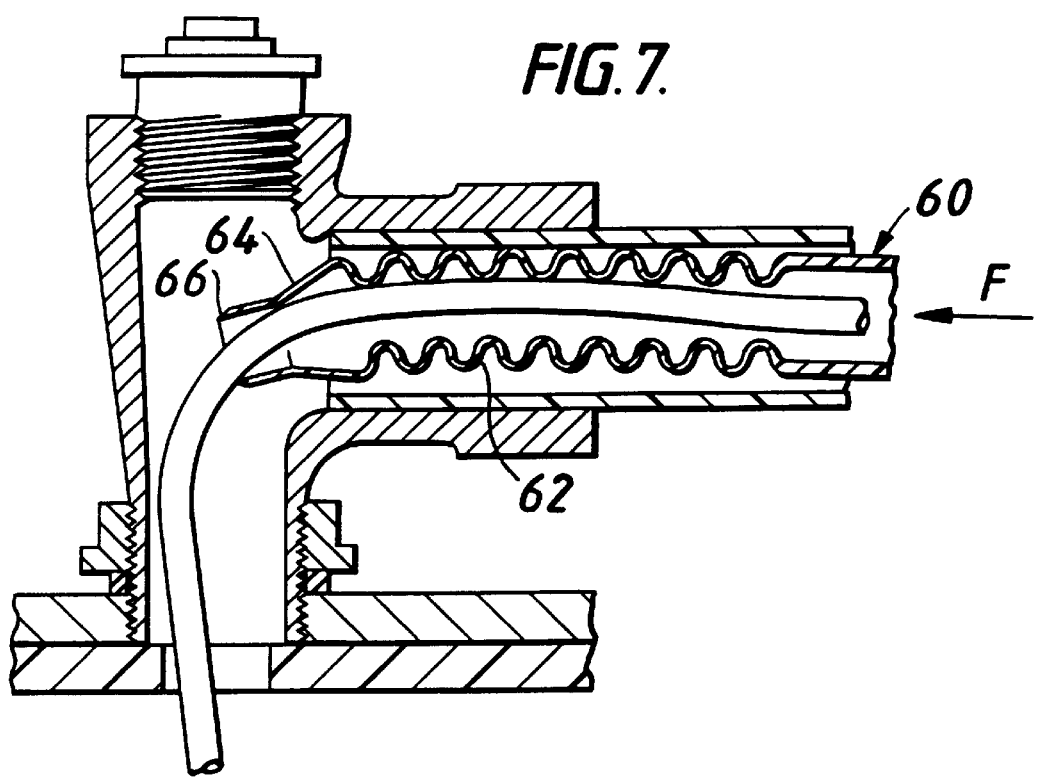
FIGS. 7 and 8 are vertical cross-sectional views of the plastic service pipe being advanced through the service pipe and main of FIGS. 1–6.
Figure 8:
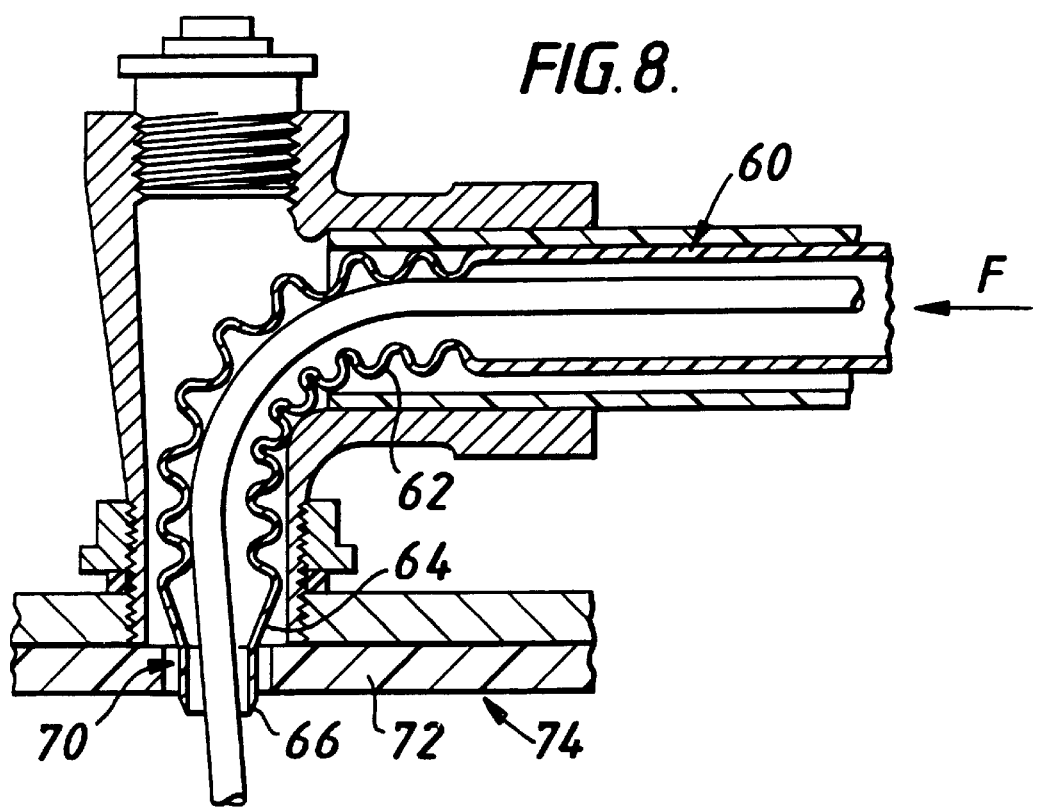

FIG. 7 and 8 show the pipe 60 being advanced through the tee 14 and into a position (FIG. 8) in which the pipe 60 can be joined to the aperture 70 in the wall 72 of the plastic liner 74 contained by the main 10. The aperture 70 has been previously formed in the wall 72 by a machine which travels along the inside of the liner 74 within the main 10.

The pipe 60 is preferably joined to the liner 10 using a machine which travels through the main 10. As an alternative the pipe 60 may be joined as an operation performed through the open end of the service pipe 12. It is also an alternative option to form the aperture 70 as an operation performed through the open end of the service pipe instead of using the machine inside the liner 74.

Figure 9:
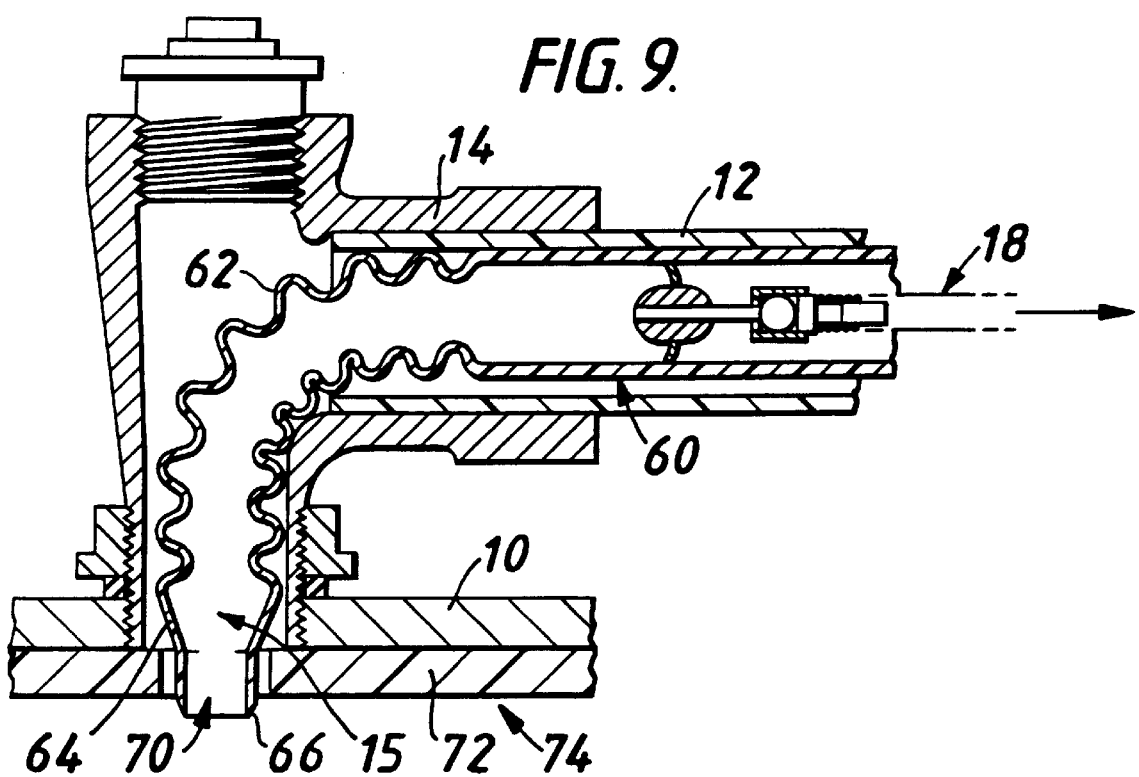
FIG. 9 is a vertical cross-sectional view of the service pipe and main of FIGS. 1–8 as the assembly is being withdrawn through the plastic service pipe.

FIG. 9 shows the assembly 18 being withdrawn through the plastic pipe 60. The fingers 36 (or the disc) deflects so as to facilitate withdrawal, the tips of the fingers 36 (on the periphery of the disc) sliding along the interior surface of the wall of the plastic pipe 60.

Figure 10:
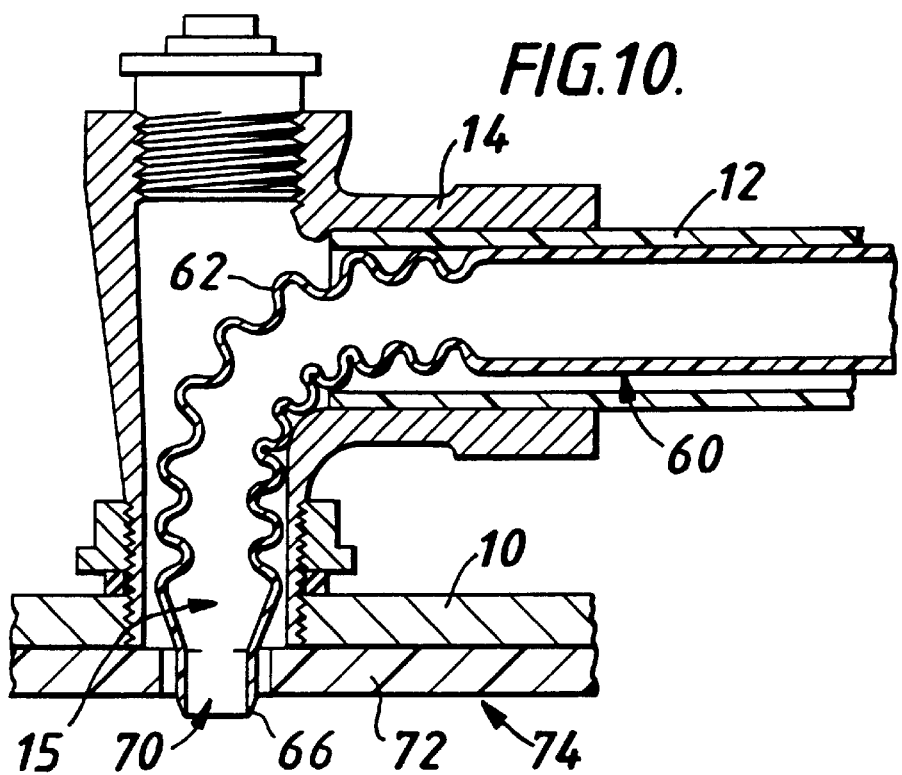
FIG. 10 is a vertical cross-sectional view of the plastic service pipe in a final position within the service pipe of FIGS. 1–9.

FIG. 10 shows the plastic pipe 60 in final position within the steel service pipe 12. Subsequently, the cylindrical section 66 forming the nose of the corrugated section 62 will be joined to the liner 74 at the aperture 70, which is aligned with the existing aperture 15 in the main 10. The section 66 is preferably joined to the liner 74 by fusion welding. However, where a different material is used for the liner and the plastic service pipe, e.g. polyvinylchloride, the pipe 60 or 62 or the section 66, depending on the type of pipe used, may be joined to the liner 74 using an adhesive cement.

When this has been done for each service connected to the main 10 and the meters have been re-connected to the plastic pipes 60 at each open end of the pipes 12 the gas can be re-admitted to the main and service pipes.

In a modification of the method described above, the flexible assembly 18 is fed through the plastic pipe 60 first of all, and then both of them are fed through the existing pipe 12. The flexible assembly 18 may be arranged to protrude from the plastic pipe 60, to provide the guidance required.

The leading portion of the flexible assembly 18 is the wire member 22, the ball and socket connection 24 and the weight 34 on the arm 32 of the ball. When the flexible assembly 18 excepting the leading portion 22, 24, 32, 34 is supported in an horizontal position and the leading portion is unsupported except for its connection with the wire member 20, the leading portion is deflected downwardly by gravity.

What is claimed is:

1. A flexible assembly for use in installing a plastic service pipe in an existing service pipe which extends from an existing aperture in a main containing a plastic liner to an open end, comprising a first, flexible, coiled wire member having at its leading end a second, flexible, coiled wire member, the stiffness of the second coiled wire member being less than the stiffness of the first coiled wire member, the second coiled wire member having at its leading end a ball-and-socket connection having only a low stiffness, said connection being formed of a ball element and a socket element of which one leads the other and is connected to a weight, said leading portion comprising said second coiled wire member, the ball-and-socket connection and said weight, and the arrangement being such that when the flexible assembly, except for said leading portion, is supported in a horizontal position and the leading portion is unsupported except for its connection with the remainder of the flexible assembly, the leading portion is deflected downwardly by gravity.

2. A flexible assembly as claimed in claim 1, wherein said weight has several flexible fingers each projecting radially away from the weight, said fingers are located on said weight such that said leading end is assisted in centralising within the existing pipe or within a tee by which the existing pipe is connected to the main and is assisted in entering said aperture in said plastic liner and such that the tips of the fingers slide along the interior of said plastic service pipe as said flexible assembly is withdrawn.

3. A flexible assembly as claimed in claim 1, wherein said weight has a flexible disc projecting from the weight and said disc is located on said weight such as to enable centralisation within the existing pipe or within a tee by which the existing pipe is connected to the main and to enable entry into said aperture in said plastic liner, and said disc being located on said weight so that the periphery of said disc slides along the interior of said plastic service pipe as said flexible assembly is withdrawn.

4. A method of installing a plastic service pipe in an existing service pipe which extends from an existing aperture in a main containing a plastic liner to an open end, the method comprising:

inserting a flexible assembly through the open end and along the existing service pipe to a position at which at least a leading portion of the flexible assembly enters an aperture in the plastic liner aligned with the existing aperture;

feeding a plastic service pipe, fitted over said flexible assembly either before or after said step of inserting, along said flexible assembly through the open end and through said existing service pipe to a position at an aperture in the plastic liner aligned with the existing aperture; and joining a leading end of the plastic service pipe to the liner at the aperture in the liner, said flexible assembly comprising a first, flexible, coiled wire member having at its leading end a second, flexible, coiled wire member, the stiffness of the second coiled wire member being less than the stiffness of the first coiled wire member, the second coiled wire member having at its leading end a ball-and-socket connecting having only a low stiffness, said connection being formed of a ball element and a socket element of which one leads the other and is connected to a weight, said leading portion comprising said second coiled wire member, the ball-and-socket connection and said weight, and the arrangement being such that when the flexible assembly, except for said leading portion, is supported in a horizontal position and the leading portion is unsupported except for its connection with the remainder of the flexible assembly, the leading portion is deflected downwardly by gravity.

5. A method as claimed in claim 4, in which said plastic service pipe comprises a corrugated wall which extends at least adjacent to said leading end of the plastic service pipe.

6. A method as claimed in claim 5, in which said plastic service pipe comprises a first main section having a cylindrical wall and being more rigid than a leading second section secured to leading end of said first section, and said leading second section having a corrugated wall.

7. A method as claimed in claim 4, in which said plastic service pipe comprises a leading portion which is shaped to facilitate joining of said plastic service pipe to said plastic liner.

8. A method as claimed in claim 7, in which said leading portion of the plastic service pipe has a cylindrical wall at its leading end joined to the remainder of said plastic service pipe by a frusto-conical wall which tapers towards said cylindrical wall, and said cylindrical wall is received in said aperture in said plastic liner.

9. A method as claimed in claim 4, in which said weight has flexible fingers each projecting radially from the weight, said fingers are located on said weight so that said leading portion is assisted in centralising within the existing service pipe or within a tee by which the existing service pipe is connected to the main and is assisted in entering said aperture in said plastic liner and so that the tips of said fingers slide along the interior of said plastic service pipe as said flexible assembly is withdrawn.

10. A method as claimed in claims 4, in which said weight has a flexible disc projecting from the weight, said disc enables centralisation within the existing pipe or within a tee by which the existing pipe is connected to the main and enables entry into said aperture in said plastic liner, and said disc is located on said weight so that the periphery of said disc slides along the interior of said plastic service pipe as said flexible assembly is withdrawn.

* * * * *